United States Patent [19]
Yoshida et al.

[11] Patent Number: 5,096,013
[45] Date of Patent: Mar. 17, 1992

[54] REDUCED-NOISE PROPULSION SYSTEM OF AIR-CUSHION VEHICLE

[75] Inventors: Ryuichi Yoshida, Takarazuka; Takashi Kawashima; Kunihiko Ishihara, both of Akashi; Tetsushi Yamamura, Takasago, all of Japan

[73] Assignee: Kawasaki Jukogyo Kabushiki Kaisha, Hyogo, Japan

[21] Appl. No.: 613,442

[22] Filed: Nov. 14, 1990

Related U.S. Application Data

[63] Continuation of Ser. No. 348,644, May 8, 1989, abandoned.

[30] Foreign Application Priority Data

May 10, 1988 [JP] Japan .............................. 63-60683[U]
Sep. 7, 1988 [JP] Japan .............................. 63-116910[U]

[51] Int. Cl.$^5$ .............................................. B60V 1/14
[52] U.S. Cl. .................................. 180/117; 180/116; 181/292; 181/290; 244/1 N; 415/119
[58] Field of Search ............... 180/116, 117, 7.4, 118, 180/119, 120; 415/119; 181/284, 290, 292, 288; 244/1 N, 53 B, 117 R

[56] References Cited

U.S. PATENT DOCUMENTS

| | | | |
|---|---|---|---|
| 3,002,341 | 10/1961 | Muzzy et al. | 415/119 |
| 3,078,939 | 2/1963 | Bollum | 180/117 |
| 3,542,152 | 11/1970 | Adamson et al. | 415/119 |
| 4,156,475 | 5/1979 | Chaplin | 180/117 |
| 4,290,500 | 9/1981 | Hopkins et al. | 180/117 |
| 4,313,512 | 2/1982 | Jutras | 180/117 |
| 4,433,751 | 2/1984 | Bonneau | 181/292 |
| 4,441,578 | 4/1984 | Rose | 181/288 |
| 4,759,513 | 7/1988 | Birbragher | 181/292 |
| 4,828,175 | 5/1989 | Heufler et al. | 415/119 |
| 4,840,541 | 6/1989 | Sakane et al. | 415/119 |
| 4,848,501 | 7/1989 | Goodwin et al. | 180/117 |

*Primary Examiner*—Charles A. Marmor
*Assistant Examiner*—Anne Marie Boehler
*Attorney, Agent, or Firm*—Wenderoth, Lind & Ponack

[57] ABSTRACT

Noise due to the rotation of the air propeller or fan of an air-cushion vehicle is reduced by: 1) reducing the cross-sectional area of the interior of a duct encompassing the fan on the downstream side relative to the upstream side; 2) using wide-chord fan blades of chords increasing from blade root to tip; 3) using a duct and a nose cone on the hub of the fan both having a sound-absorbing structure; and 4) mounting the engine and the duct on a common rigid support base and reducing to a minimum the tip clearance between the tips of the fan blades and the duct inner wall surface.

6 Claims, 4 Drawing Sheets

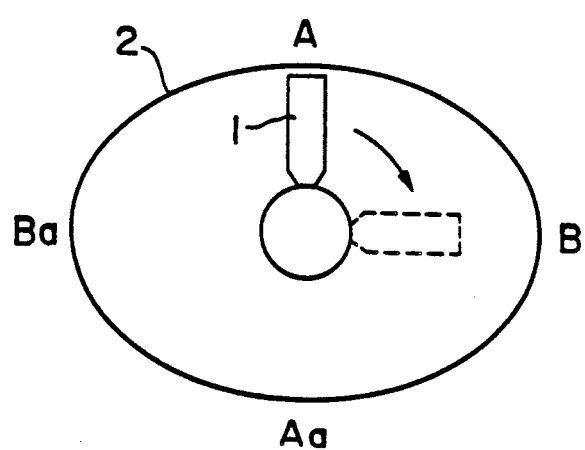
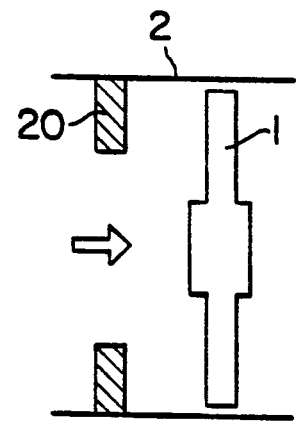
FIG. 9  FIG. 10
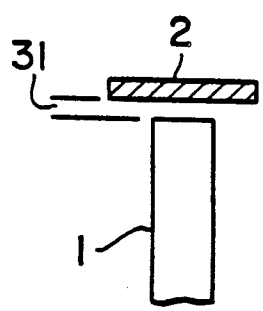
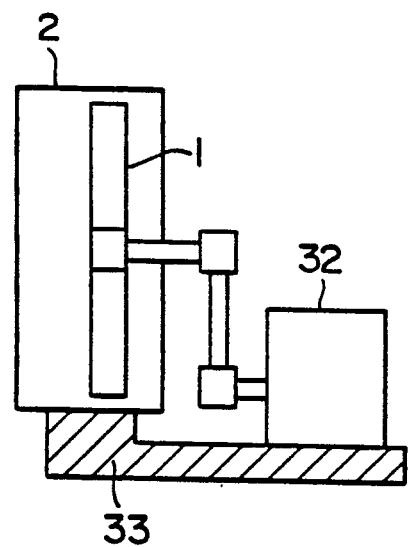
FIG. 11  FIG. 12

REDUCED-NOISE PROPULSION SYSTEM OF AIR-CUSHION VEHICLE

This application is a continuation of now abandoned application, Ser. No. 348,644, filed on May 8, 1989.

BACKGROUND OF THE INVENTION

The present invention relates generally to so-called air-cushion vehicles (known also as hovercraft and surface-effect vehicles). A craft of this type can be propelled to travel in a wafted state over any of various different surfaces such as ground, water, ice, snow, and marshes. The craft is thus lifted by a cushion of air formed and maintained below the vehicle by pressurized air which is a portion of air blown by an engine driven propeller or fan mounted on the vehicle body or hull. The above mentioned surfaces function as pressure receiving surfaces against which the pressurized air acts.

More particularly, the present invention relates to the propulsion system including the fan of an air-cushion vehicle (hereinafter referred to as ACV), in which system the noise emitted by the fan is reduced to a minimum by a number of innovative measures and means of the present invention.

A typical example of an ACV of the character briefly described above, is illustrated in FIGS. 15 and 16 of the accompanying drawings. A greater part of the air blown by the fan is directed aft from the hull to function as the propulsive force or thrust to propel the hull forward. In general, the fan has a number of blades, which are encompassed around their tips by a cylindrical duct. This duct is spaced apart by a small clearance from the tips of the fan blades and is rigidly supported relative to the ACV body or hull.

In a conventional ACV, the inner diameter and the outer diameter of the duct are respectively constant from the duct inlet to the outlet, and the longitudinal section of the duct in its axial direction is rectangular. Furthermore, the chord length of each fan blade is constant in its spanwise direction i.e., from root to tip, or tapers to a narrow tip chord. Another feature of a conventional ACV is that the engine and the duct are respectively mounted independently on the ACV body. The duct is generally fabricated from a plate material such as thin steel plate, aluminum plate, or an FRP plate.

In the above described prior art, it has been possible to lift up the hull of an ACV and to cause it to travel stably over various kinds of surfaces. However, special measures have never been considered in the fan, the duct, and related parts with respect to reducing noise. Consequently, the noise generated from the fan and the duct which encompasses the fan to form an air stream path is transmitted to the cockpit. This noise annoys the driver and passenger of the vehicle.

SUMMARY OF THE INVENTION

According to the present invention, there is provided a low-noise propulsion system of an ACV comprising: an engine mounted on a rigid support base fixed to the hull of the ACV; a fan having a hub, blades secured thereto and extending radially therefrom, the fan being coupled to and driven by the engine to propel the ACV; and a duct mounted on the same support base as the engine and coaxially encompassing the fan to form an air stream path therefor and a nose cone coaxially fixed to the duct. This propulsion system is characterized by the following features all serving to reduce noise arising from the operation of the fan.

1. The duct has an aftwardly constricted shape wherein the cross-sectional area of its interior at parts downstream from the fan is smaller than that at parts upstream of the fan.

2. Each fan blade is a wide-chord blade, the chord of which increases from root to tip.

3. The duct and the nose cone have a sound-absorbing structure.

4. The engine and the duct are mounted on a common support base of high rigidity as stated above, and the inner wall surface of the duct is fabricated with a high degree of circularity, whereby the clearance between the tips of the fan blades and the duct inner wall surface is reduced to a minimum during operation.

The nature, utility, and further features of the present invention will become more clearly understood from the following detailed description when read in conjunction with the accompanying drawings, briefly described below.

BRIEF DESCRIPTION OF THE DRAWINGS

In the accompanying drawings:

FIGS. 9 through 12 are respectively an axial view and side views illustrating the relationship between the circularity or roundness of the duct, a common support base of the duct encompassing a fan and the engine, and blade tip clearance;

DETAILED DESCRIPTION OF THE PREFERRED EMBODIMENTS

Figure 13:
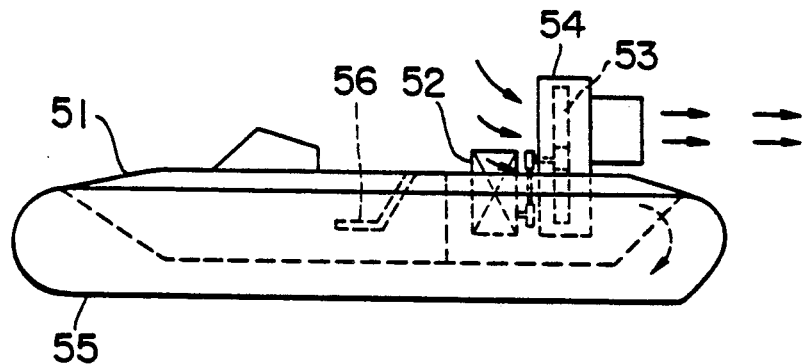
FIGS. 13 and 14 are respectively a side elevation and a plan view of an example of an ACV of the prior art.
Figure 14:
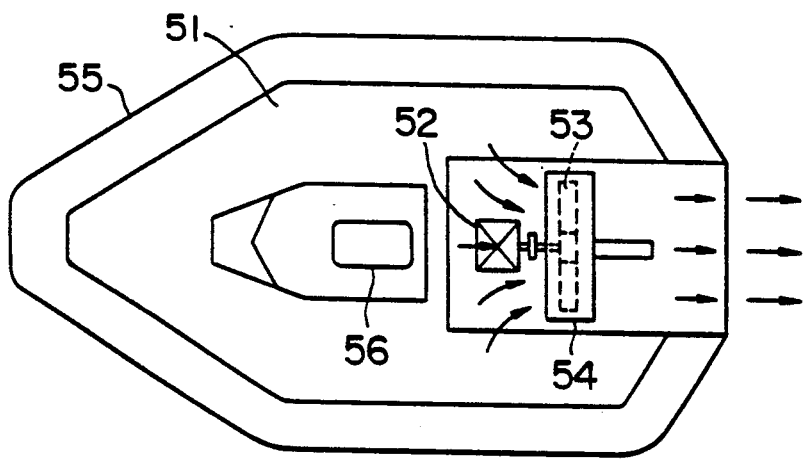

A representative example of a conventional ACV, as described briefly hereinbefore, is illustrated in FIGS. 13 and 14. This ACV has a body or hull 51 in which an engine 52 is mounted for driving a propeller or fan 53. The fan rotates within a duct 54 supported by a part of the body 51. The body 51 is provided around the periphery of its bottom part with a skirt 55. A driver's seat 56 is provided in the body 51 forward of the fan 53.

Figure 15:
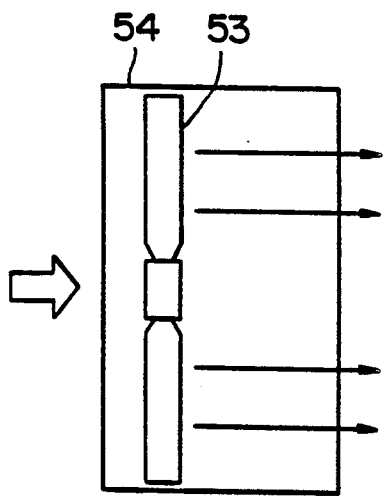
FIG. 15 is a side view, partially in longitudinal section, indicating the flow of air through a duct of the prior art.
Figure 16:
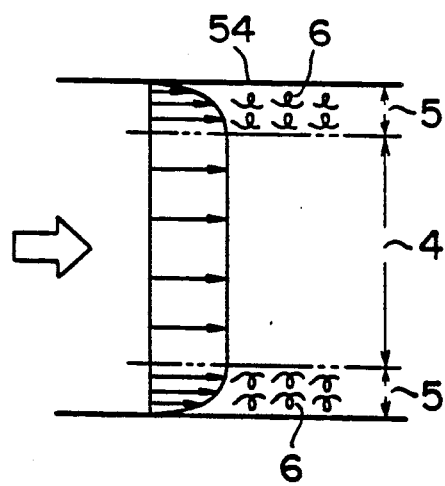
FIG. 16 is a side sectional view indicating the flow velocity distribution of air flowing through a duct of the prior art.

In this ACV, the duct 54 has a cylindrical shape with constant inner and outer diameters from the forward inlet end to the aft outlet end. The state of air propelled by the fan 53 through the duct 54 is of a known character as indicated in FIGS. 15 and 16. FIG. 15 indicates the general flow of the air, while FIG. 16 indicates the flow velocity distribution of the air. As indicated in FIG. 16, the air in the central part of the duct 54 is in a state of uniform flow 4, while that in the neighborhood of the inner wall surface of the duct 54 is in a state of shear flow, vortexes 6 being formed therein.

Figure 1:
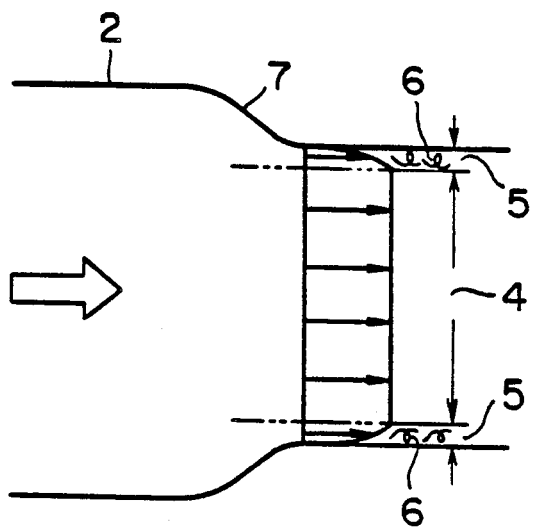
FIG. 1 is a side view of a duct encompassing a fan (not shown) and provided with a constricted portion downstream of the fan, the velocity distribution of the air flow through the constricted downstream portion being indicated.

In contrast, according to the present invention as shown in FIG. 1, a smoothly constricting part 7 with an inner surface of fair curves is formed in the duct 2 at its aft part downstream from the fan 1 (not shown). Thus the duct at its aft end part downstream from the constricting part 7 is of reduced diameter relative to the forward inlet part. Therefore, the air flow velocity becomes large in this reduced-diameter part, whereby the shear flow layer becomes thinner. At the same time, the air flow is straightened, and the generation of vortexes 6 is suppressed. Accordingly, noise within the duct 2 due to the vortexes 6 is reduced.

Figure 2:
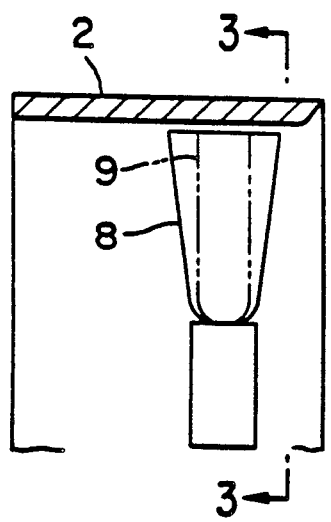
FIGS. 2 and 3 are respectively partial side and axial views showing a wide-chord blade of a fan in relation to a duct.
Figure 3:
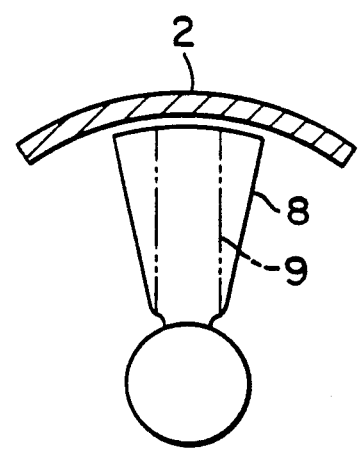

Another feature of this invention is the use of a fan with wide-chord blades as shown in FIGS. 2 and 3. The chord of each wide-chord blade 8 increases from root to tip. In contrast the conventional blade 9 has a constant chord as indicated by the two-dot chain line or has a chord which decreases from root to tip. For the same rotational speed of the fan, the quantity of work output of the wide-chord blade 8 is larger than that of the conventional blade 9, and, accordingly, the thrust produced by the wide-chord blade 8 is greater than that produced by the conventional blade 9. Therefore, with respect to the same thrust, the fan rotating speed of the wide-chord blade 8 is slower than that of the conventional blade 9.

The predominant factor of the power level of noise is the factor which is proportional to the 6th power of the tip speed of the blades as indicated by the following equation. Accordingly, reducing the fan rotating speed has the effect of reducing the noise generating therefrom.

$$PWL = \left[ YN_0 + 60\log\frac{W}{W_0} + 10\log\sigma \right] + 10\log nRt^2(1 - v^2) + F_v$$

where:
  $YN_O$ is specific power level ($68 \pm 3$ dB);
  W is relative velocity;
  $W_O$ is reference velocity (10 m/s);
  $\sigma$ is solidity (blade chord/pitch);
  Rt is fan radius;
  v is boss ratio; and
  $F_v$ is boss ratio correction term.

Figure 4:
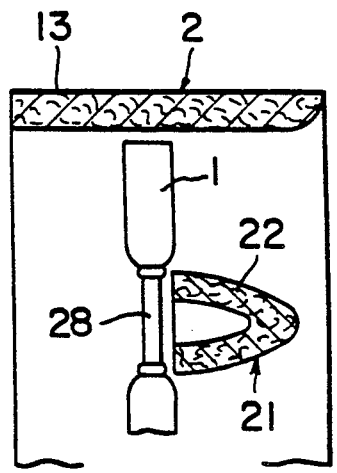
FIG. 4 is a partial side view, with parts in longitudinal section, of a fan, duct, and nose cone according to the present invention.
Figure 5:
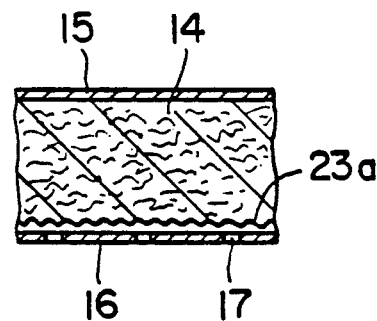
FIG. 5 is fragmentary, relatively enlarged side view showing a sound-absorbing duct wall having a composite structure.
Figure 6:
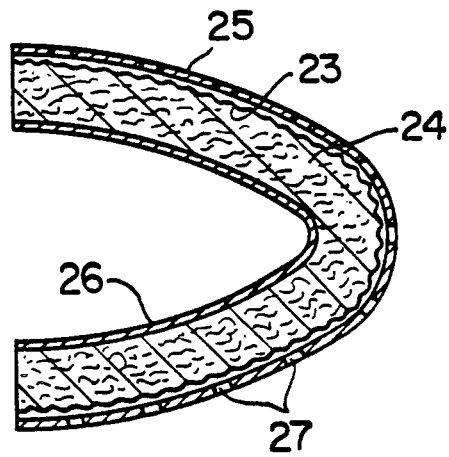
FIG. 6 is a relatively enlarged side view showing a sound absorbing nose cone having a composite structure.

Referring to FIGS. 4, 5, and 6, the duct 2 encompassing the fan 1 constitutes a sound-absorbing structure 13, which comprises a duct outer sheet or covering 15, a duct inner sheet 16 provided with perforations 17, and a sound-absorbing material 14 interposed therebetween. Similarly, a "nose cone" 21, provided to constitute a tail fairing for the fan hub 28 of the fan 1, constitutes a sound-absorbing structure 22 which comprises an outer sheet 25 provided with perforations 27, an inner sheet 26 and a sound-absorbing material 24 interposed therebetween.

The inner surface of the sound-absorbing material 14 is lined with a water barrier film 23a, while the outer surface of the sound-absorbing material 24 is enveloped by a water barrier film 23. Alternatively, these sound-absorbing materials 14 and 24 are previously subjected to a treatment to repel water such as a coating treatment or impregnation with a fluorine liquid. The water barrier films 23 and 23a are also processed by a treatment to repel water, oil by coating or impregnation with a fluorine liquid.

Figure 7:
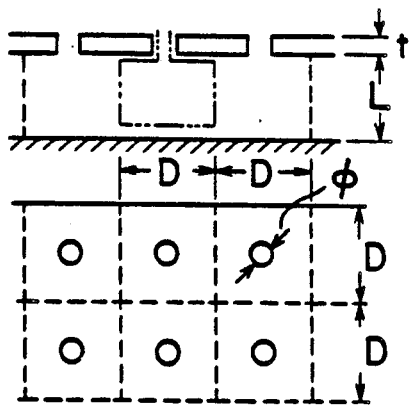
FIGS. 7 and 8 are diagrams illustrating the theory of sound absorption relating to the present invention.
Figure 8:
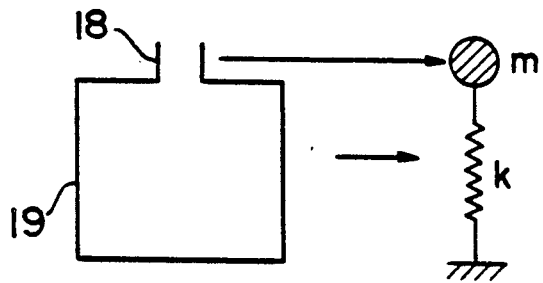

The sound absorption principle will now be theoretically considered with reference to FIGS. 7 and 8. Here the perforated parts of the duct inner layer 16 or the nose cone outer layer 25 can be represented by a neck 18 part, the volume of air in which has a mass m, and the shell 19 part undergoes the motion of a spring k, by which is constituted a vibration system. The natural frequency f of this system can therefore be represented by the following equation.

$$f = \frac{C}{2\pi} \sqrt{\frac{P}{(t + 0.8\Phi)L}}, \quad (I)$$

wherein:
  t is the thickness of the plate with perforations;
  $\Phi$ is the perforation diameter;
  L is the depth of air layer;
  D is the pitch; and
  P is the perforation rate ($\pi\Phi^2/4D^2$).

When a sound wave of the same frequency as the natural frequency is introduced into this system, resonance occurs. At this time, the air corresponding to the mass m supported by the spring k vibrates with a large amplitude, and sound absorption (conversion into heat energy) is caused by the frictional resistance of the surroundings. By filling the air layer with a sound-absorbing material comprising a porous material, such as glass wool, the resistance is increased, and the sound-absorbing effect is further enhanced.

The sound-absorbing structure of the aforedescribed construction has a peak sound-absorbing rate at the natural frequency f indicated by the above equation (I). And, the sound-absorbing rate which is indicated at frequencies between ½ and 2 times the natural frequency f is more than 50% of the peak value. Thus, sound absorption is effectively possible over a relatively wide frequency band. On the basis of this feature, in the case where, for example, the fundamental rotational noise (fan rotational speed × number of blades × order) of the ACV is 450 Hz, peaks of the emitted noise appear at 450 Hz (fundamental) and 900 Hz (second order). Furthermore, the component of the turbulent flow noise (wide band noise), predominant relative to the total noise level, is under 1,000 Hz. For this reason, it becomes possible to obtain an effective sound-absorbing duct by determining the dimensions such as t, L, D, and $\Phi$ which all the natural vibration frequency calculated from equation (I) at a frequency of 650 Hz, midway between the fundamental and second order.

The relationships between the circularity of the inner wall surface of the duct 2, the common support base 33 of the engine 32 and the duct 2 encompassing the fan 1, and the clearance between the fan blade tips and the inner wall surface of the duct (hereinafter referred to as tip clearance) will be considered with reference to FIGS. 9 through 12. If the figure of the inner wall surface of the duct 2 as viewed in cross section is a true circle, the fluid resistance at the tips of the blades 8 of the fan 1 with respect to the rotation thereof will be constant relative to time.

However, in the case where this cross-sectional figure is an ellipse as shown in exaggerated form in FIG. 9, each blade tip passes by two positions (A, Aa) of small tip clearance and two positions (B, Ba) of large tip clearance for each revolution of the fan. Consequently, fluid resistance varies with time. This is equivalent to the presence of flow obstructions 20 at two opposite positions on the upstream side of the fan 1 as indicated in FIG. 10. Consequently, the circulation around the blades is varied, and a pressure fluctuation occurs on the blade surfaces. Since the pressure fluctuation on the blade surfaces becomes a source of noise, the use of a duct 2 with a high degree of circularity is effective in reducing noise.

By reducing the tip clearance 31 of each fan blade shown in FIG. 11, the rate of air flow through this tip clearance 31 from the blade pressure surface side to its suction surface side is reduced, and a tendency of the thickness of the boundary layer of the flow to become thin is exhibited. Thus the wake width is reduced. On the other hand, the vortexes shedding off the trailing edge of each blade gives rise to energy of sound E which can be expressed by the following equation.

$$E = \pi B \rho \int D W^6 a R / 2,400 a_o^3$$

where:
- $a_o$ is the velocity of sound;
- D is the wake width;
- B is the number of blades;
- $\rho$ is the air density;
- E is the acoustic power output; and
- W is the relative velocity at the fan inlet.

Therefore it becomes possible to reduce the noise level by reducing the wake width D. In this case, in order to obtain an effective reduction of the noise level, it is necessary to maintain the tip clearance 31 at a small value. This has heretofore been difficult since, in the conventional ACV the duct 2 encompassing the fan 1 and the engine 32 to which the fan 1 is coupled have been mounted separately on the hull, whereby it has been difficult to maintain the tip clearance 31 at a constant value because of the vibration of the hull structure.

Accordingly, according to the present invention, a rigid common support base 33 is fixed to the hull structure, and the duct 2 and the engine 32 to which the fan 1 is coupled are mounted on this common support base 33. Thus it becomes possible to maintain the tip clearance at a constant, relatively small value even when the ACV is operating.

The present invention as described above affords the following advantageous features and effects in an ACV propulsion system.

The duct at its part downstream from the fan is shaped to be constricted with a smooth surface of fair curves. As a result, the vortexes formed in the air flow region near the inner wall surface of the conventional duct are reduced, whereby it becomes possible to reduce the noise due to these vortexes.

Furthermore, by the use of a duct with the above described constricted part and another part of a different cross-sectional area in combination with wide-chord fan blades by which a great thrust can be produced at a low fan speed, an even more effective reduction of noise can be achieved.

By the provision of a sound-absorbing duct designed to absorb noise of the character emitted by the fan, the noise level can be further reduced. A further reduction of noise is attained by providing a sound-absorbing nose cone The duct encompassing the fan and the engine to which the fan is coupled are mounted on a common support base, whereby the clearance between the fan blade tips and inner wall surface of the duct is decreased, and the formation of eddies is reduced. As a result, noise is further reduced, and moreover the fan efficiency is increased.

What is claimed is:

1. A low-noise propulsion system of an air-cushion vehicle, comprising: an engine mounted on said vehicle; a fan having a hub and blades secured thereto and extending radially therefrom, said fan being coupled to and driven by said engine to propel said vehicle, and each of said blades being a wide-chord blade, the chord of which increases from blade root to blade tip; a duct mounted on said vehicle and coaxially encompassing said fan to form an air stream path for air propelled by said fan, said duct having a sound-absorbing laminated structure comprising an outer covering sheet without perforations, an inner sheet with a plurality of perforations, a layer of sound-absorbing material interposed between the outer covering sheet and the inner sheet, and a water barrier film interposed between the layer of sound-absorbing material and the inner sheet, said duct having a constricting portion downstream of said fan with respect to the direction in which air is propelled by said fan in a forward thrust direction constricting said duct to a cross-sectional area which is smaller than that of a portion of said duct that is upstream from said fan with respect to said direction; and a nose cone mounted to said duct centrally therein adjacent said fan, said nose cone having a sound-absorbing structure comprising an outer cone sheet with a plurality of perforations, an inner cone sheet without perforations, a layer of a sound-absorbing material interposed between the outer cone sheet and the inner cone sheet, and a water barrier film interposed between the layer of sound-absorbing material thereof and said outer cone sheet.

2. The low-noise propulsion system as claimed in claim 1, further comprising a highly rigid common support base, and wherein the inner wall surface of said duct has a high degree of circularity, said fan is centered in said duct and coupled to and driven by said engine, and said engine and said duct are mounted on said common support base, whereby the clearance between the tips of the blades of the fan and said inner wall surface is maintained at a small value during operation of the fan.

3. The low-noise propulsion system of claim 1, wherein said nose cone is a tail fairing disposed downstream of said fan in said duct.

4. The low-noise propulsion system of an air-cushion vehicle, comprising: an engine mounted on said vehicle; a fan having a hub and blades secured thereto and extending radially therefrom, said fan being coupled to and driven by said engine to propel said vehicle, and each of said blades being a wide-chord blade, the chord of which increases from blade root to blade tip; a duct mounted on said vehicle and coaxially encompassing said fan to form an air stream path for air propelled by said fan, said duct having a sound-absorbing laminated structure comprising an outer covering sheet without perforations, an inner sheet with a plurality of perforations, a layer of sound-absorbing material interposed between the outer covering sheet and the inner sheet, and a water barrier film interposed between the layer of sound-absorbing material and the inner sheet, said duct having a means for reducing the noise generated by air vortexes along said duct by suppressing the generating of the vortexes, said means comprising a constricting portion downstream of said fan with respect to said direction; and a nose cone mounted to said duct centrally therein adjacent said fan, said nose cone having a sound-absorbing structure comprising an outer cone sheet with a plurality of perforations, an inner cone sheet without perforations, a layer of a sound-absorbing material interposed between the outer cone sheet and the inner cone sheet, and a water barrier film interposed between the layer of sound-absorbing material thereof and said outer cone sheet.

5. The low-noise propulsion system as claimed in claim 4, further comprising a highly rigid common support base, and wherein the inner wall surface of said duct has a high degree of circularity, said fan is centered in said duct and coupled to and driven by said engine, and said engine and said duct are mounted on said common support base, whereby the clearance between the tips of the blades of the fan and said inner wall surface is maintained at a small value during operation of the fan.

6. The low-noise propulsion system of claim 4, wherein said nose cone is a tail fairing disposed downstream of said fan in said duct.

* * * * *